(12) United States Patent
Byrne et al.

(10) Patent No.: US 11,105,703 B2
(45) Date of Patent: Aug. 31, 2021

(54) RETAINING INTERNAL PRESSURE IN A DATA STORAGE DEVICE IN A VACUUM

(71) Applicant: Seagate Technology LLC, Cupertino, CA (US)

(72) Inventors: Christopher Byrne, Longmont, CO (US); Samuel Severson, Longmont, CO (US); Jason Delaney, Loveland, CO (US); John Rigsby, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 454 days.

(21) Appl. No.: 16/113,721

(22) Filed: Aug. 27, 2018

(65) Prior Publication Data

US 2020/0064220 A1   Feb. 27, 2020

(51) Int. Cl.
  *G01M 3/04*   (2006.01)
(52) U.S. Cl.
  CPC ..................................... *G01M 3/04* (2013.01)
(58) Field of Classification Search
  CPC ..................................................... G01M 3/04
  See application file for complete search history.

(56) References Cited

U.S. PATENT DOCUMENTS

| | | | |
|---|---|---|---|
| 6,144,178 A | 11/2000 | Hirano et al. | |
| 6,513,366 B1* | 2/2003 | Stauffer | G01M 3/329 73/49.3 |
| 6,567,235 B2 | 5/2003 | Kasetty et al. | |
| 8,035,923 B2 | 10/2011 | Suzuki et al. | |
| 8,659,849 B2 | 2/2014 | Hayakawa et al. | |
| 9,377,374 B2 | 6/2016 | Brine et al. | |
| 9,754,631 B2 | 9/2017 | Severson et al. | |
| 9,818,454 B1 | 11/2017 | Albrecht et al. | |
| 2016/0178472 A1* | 6/2016 | Watanabe | G01M 3/20 73/40.7 |
| 2017/0110158 A1* | 4/2017 | Durrum | B65B 31/046 |
| 2018/0066163 A1* | 3/2018 | Furuta | B32B 37/12 |

* cited by examiner

*Primary Examiner* — Jamel E Williams
(74) *Attorney, Agent, or Firm* — Westman, Champlin & Koehler, P.A.

(57) ABSTRACT

An apparatus includes a test chamber and a pressure-application structure. The pressure-application structure is configured to apply a force on a device under test within the test chamber in response to a vacuum being drawn in the test chamber. The force has a magnitude that is proportional to a difference between an external pressure outside the test chamber and an internal pressure within the test chamber.

19 Claims, 9 Drawing Sheets

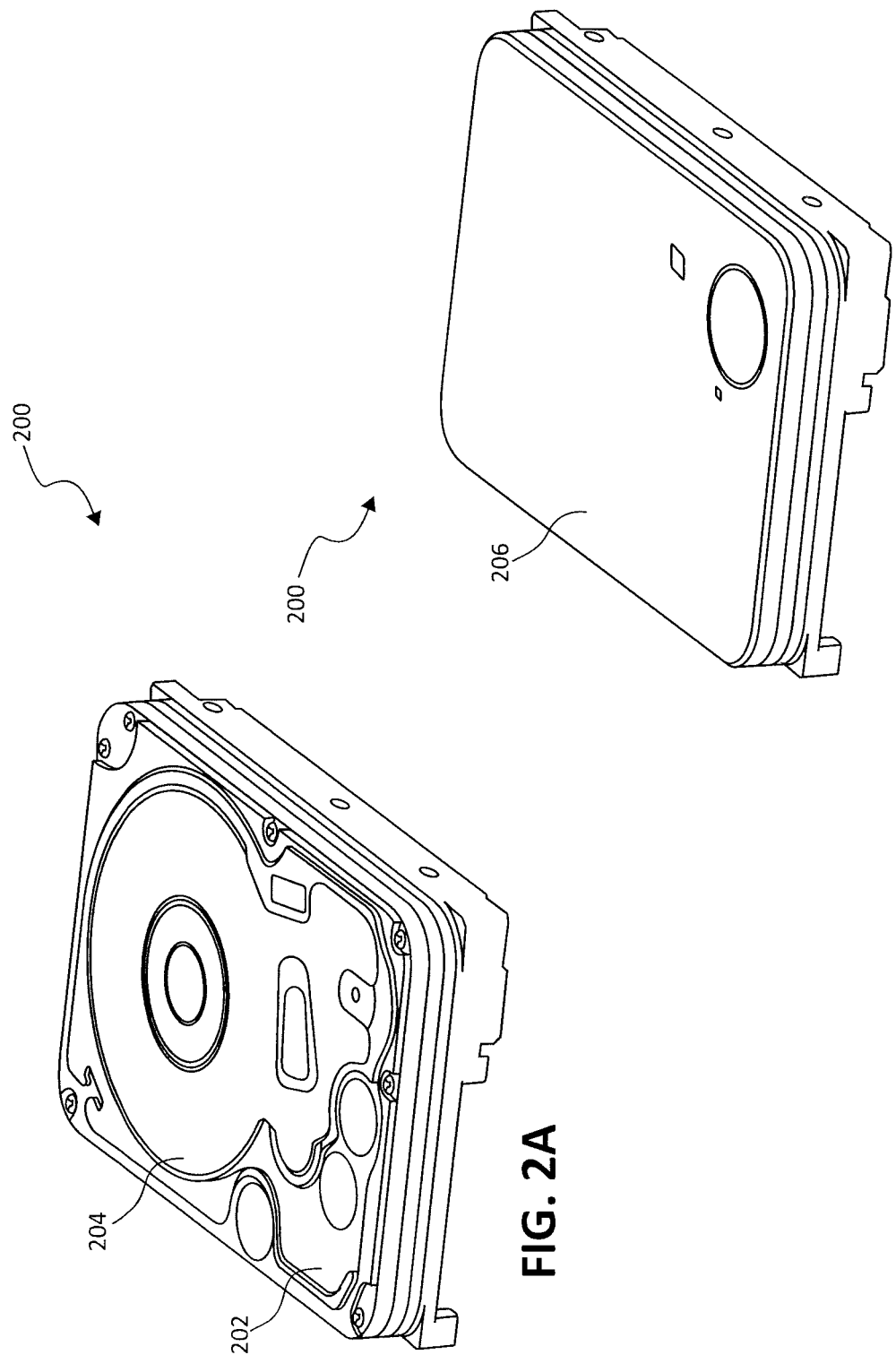

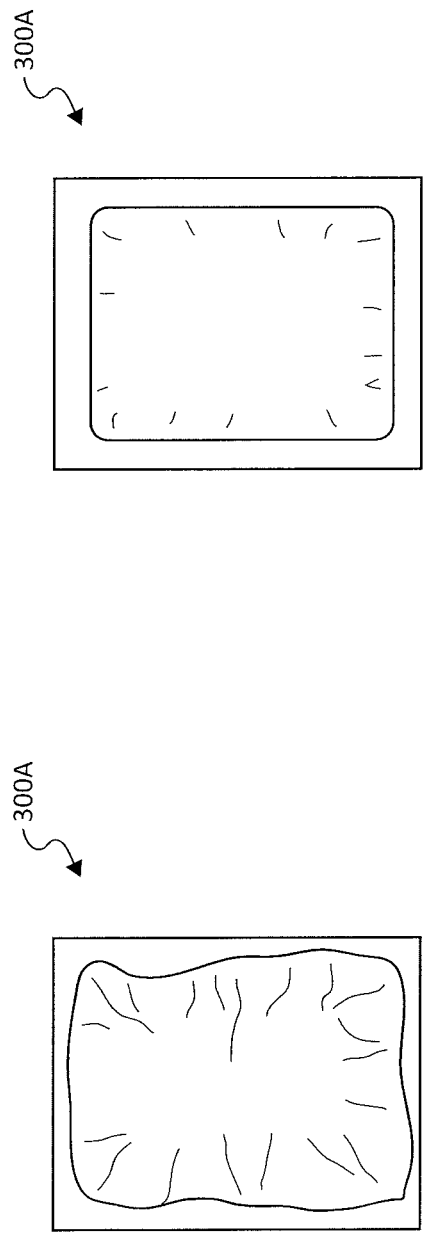
FIG. 3A
FIG. 3B
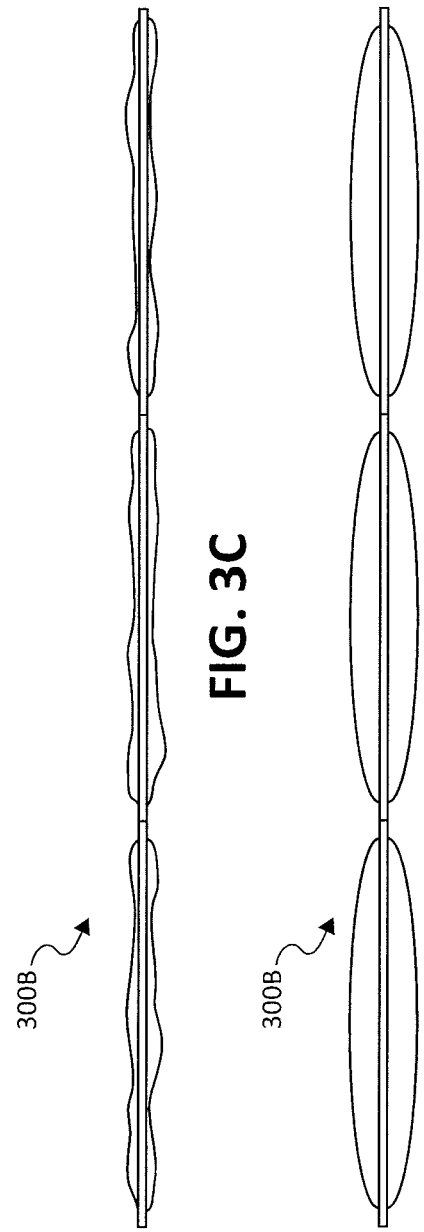
FIG. 3C
FIG. 3D

RETAINING INTERNAL PRESSURE IN A DATA STORAGE DEVICE IN A VACUUM

SUMMARY

In one embodiment, an apparatus is provided. The apparatus includes a test chamber and a pressure-application structure. The pressure-application structure is configured to apply a force on a device under test within the test chamber in response to a vacuum being drawn in the test chamber. The force has a magnitude that is proportional to a difference between an external pressure outside the test chamber and an internal pressure within the test chamber.

In another embodiment, a method is provided. The method includes providing a pressure-application element. The method also includes introducing a multi-chambered data storage device into a test chamber with the pressure-application element being positioned above the multi-chambered data storage device. The method further includes drawing a vacuum in the test chamber. The vacuum causes the pressure-application element to provide a force on an outer cover of the multi-chambered data storage device, thereby substantially preventing leakage of gas from a first chamber of the multi-chambered data storage device into a second chamber of the multi-chambered data storage device.

In yet another embodiment, an apparatus is provided. The apparatus includes a test chamber. The apparatus also includes a pressure-application structure configured to apply a force on a gas-filled multi-chambered device under test (DUT) in the test chamber. The applied force prevents leakage of the gas from a first chamber of the multi-chambered DUT into a second chamber of the multi-chambered DUT. The apparatus further includes a gas sensor that is configured to detect leakage of the gas from the multi-chambered DUT into the test chamber.

This summary is not intended to describe each disclosed embodiment or every implementation of the method for retaining internal pressure in a data storage device disclosed herein. Many other novel advantages, features, and relationships will become apparent as this description proceeds. The figures and the description that follow more particularly exemplify illustrative embodiments.

BRIEF DESCRIPTION OF THE DRAWINGS

FIGS. 2A-2D are diagrammatic illustrations of portions of a hard disc drive (HDD).

FIGS. 3A-3D are diagrammatic illustrations of vacuum sealed vapor-barrier bags, which are pressure-application structures in accordance with embodiments of the disclosure.

DETAILED DESCRIPTION OF ILLUSTRATIVE EMBODIMENTS

Figure 1:
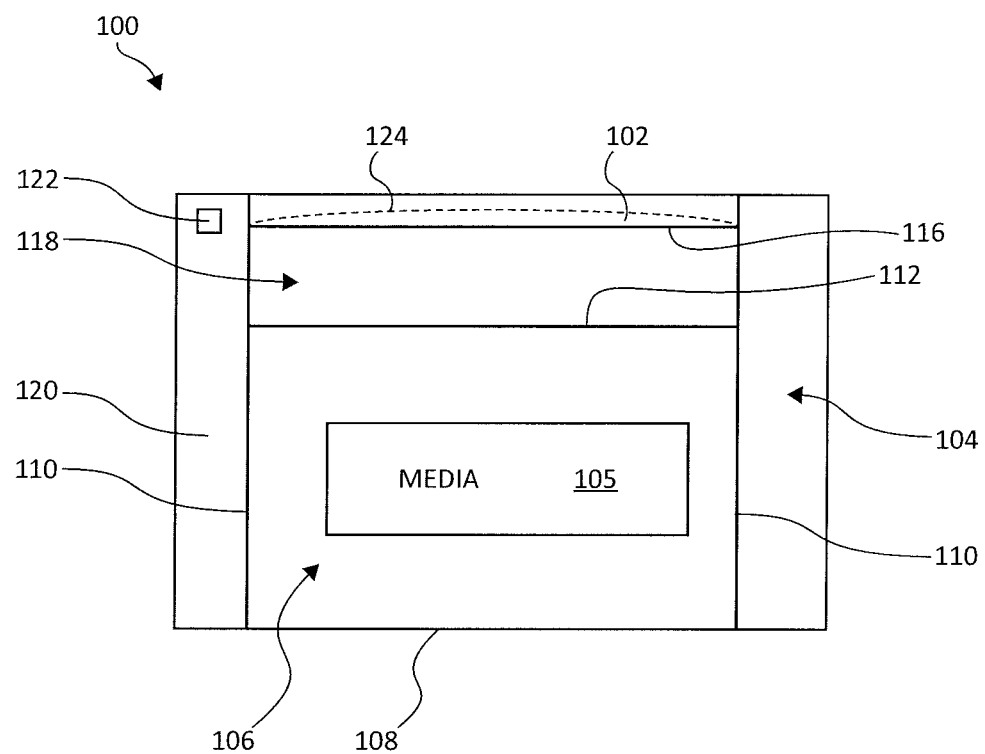
FIG. 1 is a diagrammatic illustration of a gas leakage tester that utilizes a pressure-application structure to help retain internal pressure in a data storage device in a vacuum in accordance with one embodiment.

Embodiments of the disclosure generally relate to retaining internal pressure in a data storage device in a vacuum. During manufacture, data storage devices, such as hard disc drives (HHDs), are hermetically sealed with a gas (e.g., helium (He)) inside. Each HDD is subjected to deep vacuum (~0.02 Torr) during a helium leak test (HLT) operation. During the HLT, a pressure difference due to the vacuum may cause delamination of a final or outer HDD cover from a pressure sensitive adhesive on an internal process cover and deformation or "bulging" of the top or final cover. This "bulging" creates a temporary pressure drop in an interstitial volume between the deformed top cover and the internal process cover. The pressure drop in the interstitial volume can result in He leaking out of the HDD internal volume. When vacuum is removed, pressure in the HDD internal volume may not return to the original state (before HLT), which is problematic. Embodiments of the disclosure, which are described below, address such problems.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a diagrammatic illustration of a gas leakage tester 100 that utilizes a pressure-application structure 102 to help retain internal pressure in a data storage device 104 in a vacuum. Data storage device 104 includes data storage media 105 in a first chamber 106 that is defined by a base 108, sidewalls 110 and a first cover 112, which together form a substantially hermetically sealed enclosure (e.g., first chamber 106) having a gas therein. A second cover 116 may be provided above the first cover 112 to protect the data storage 104. Second cover 116 may be attached by any suitable technique (e.g., by welding) such that a second substantially hermetically sealed chamber 118 is formed between the first cover 112 and the second cover 116.

Gas leakage tester 100 includes a test chamber 120 and a gas sensor 122 (e.g., a mass spectrometer detector). A vacuum pump (not shown) may be employed to remove air and other gases from within the test chamber 120 to provide a low-pressure environment, referred to as a vacuum. If, in the low pressure environment, gas from within the data storage device 104 leaks outside the device 104, the leakage is detected by sensor 122 and the data storage device 104 is found to be defective. However, as indicated above, even when gas from within the data storage device 104 does not leak outside the device 104, the low-pressure environment within the test chamber 120 may cause the second cover 116 of device 104 to deform or bulge in a manner shown by dashed line 124. As noted above, the bulging creates a temporary pressure drop in the second chamber 118, which can result in gas leaking out of the first chamber 106.

To prevent the bulging shown by dashed line 124, pressure-application structure 102 is employed. Pressure-application structure 102 is configured to apply pressure to the second cover 116 of the data storage device 104 such that pressure applied by structure 102 increases in proportion with a reduction in pressure within test chamber 120. In other words, as vacuum within test chamber 120 ramps up, there is a corresponding ramp up in pressure applied by structure 102. Accordingly, pressure-application structure 102 prevents bulging of the second cover 116 during a gas leak test performed on data storage device 104, which in turn prevents the temporary pressure drop in the second chamber 118. Details regarding different embodiments of pressure-application structure 102 are provided further below.

Figure 2D:
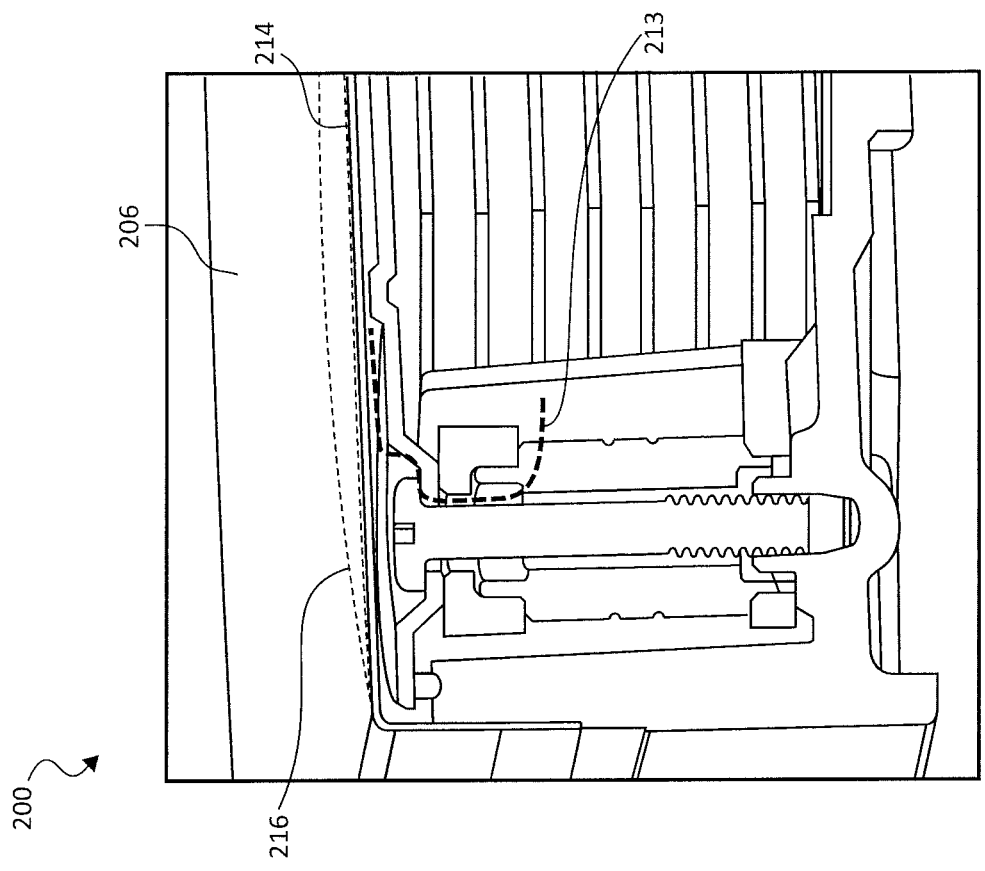
Figure 2C:
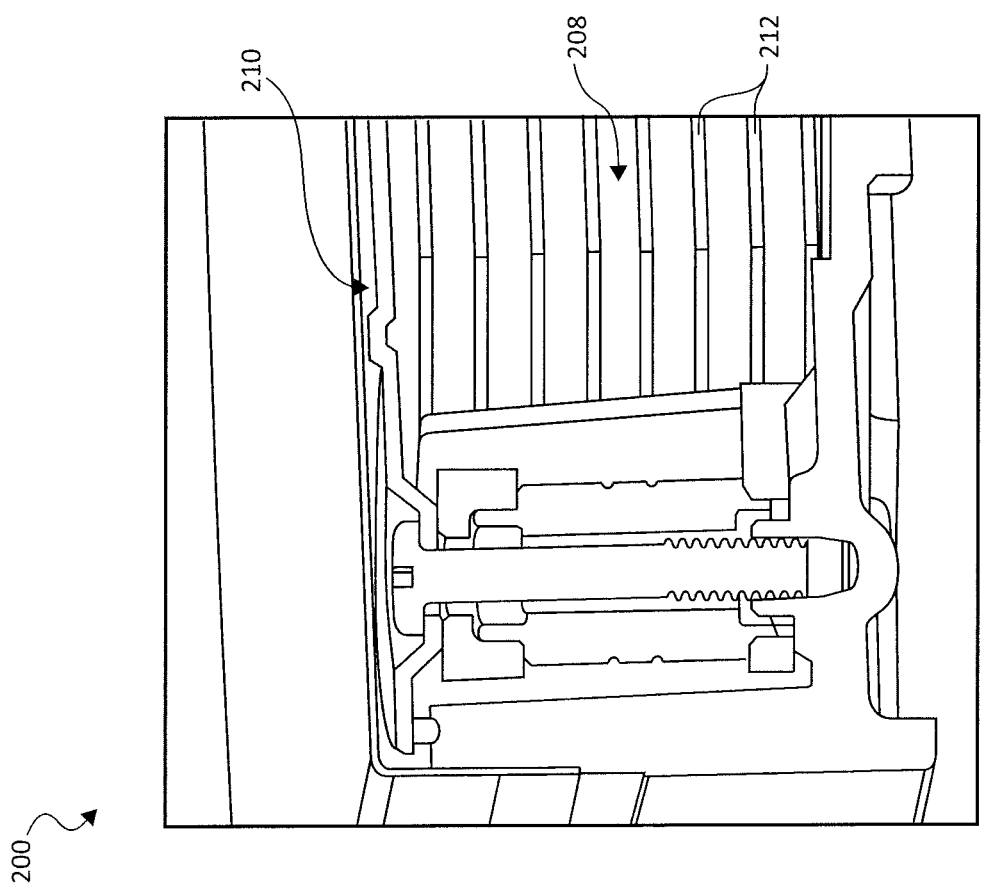

FIGS. 2A-2D are diagrammatic illustrations of portions of a HDD 200. FIG. 2A shows HDD 200 without its eternal or final cover. Accordingly, an upper portion of FIG. 2A includes a process cover 202 with an adhesive (e.g., a pressure sensitive adhesive (PSA)) 204 thereon. Adhesive 204 helps attach a final cover 206 shown in FIG. 2B to process cover 202. FIG. 2C is a cross-sectional view of a portion of HDD 200. In FIG. 2C, an internal volume of HDD 200 is denoted by reference numeral 208 and an interstitial volume between process cover 202 and final cover 206 is denoted by references numeral 210. In one embodiment, both internal volume 208 and interstitial volume 210 are filled to about 680 millibar (mbar) He. As can be seen in FIG. 2C, internal volume 208 includes data storage media (e.g., data storage discs) 212. FIG. 2D is a cross-sectional view of a portion of HDD 200 that is substantially similar to the cross-sectional view shown in FIG. 2C. FIG. 2D shows an example He leak path 213 when HDD 200 is under vacuum. In FIG. 2D, a profile 216 of final cover 206 when HDD 200 is under vacuum is bulged relative to a profile 214 of final cover 206 when HDD 200 is not under vacuum.

FIGS. 3A, 3B, 3C and 3D are diagrammatic illustrations of vacuum sealed vapor-barrier bags 300A and 300B, which are pressure-application structures in accordance with embodiments of the disclosure. In the embodiment of FIGS. 3A and 3B, vacuum sealed vapor-barrier bag 300A is a single relatively large "pillow," which contains a small amount of air. In FIG. 3A, bag 300A is relatively flat under atmospheric pressure conditions. In FIG. 3B, bag 300A is in an expanded state under vacuum. In the embodiment of FIGS. 3C and 3D, instead of single vacuum sealed vapor-barrier bag 300A, multiple relatively small bags 300B are employed. Each of the multiple bags 300B contains a small amount of air. In FIG. 3C, bags 300B are relatively flat under atmospheric pressure conditions. In FIG. 3D, bags 300B are in an expanded state under vacuum.

Figure 3E:
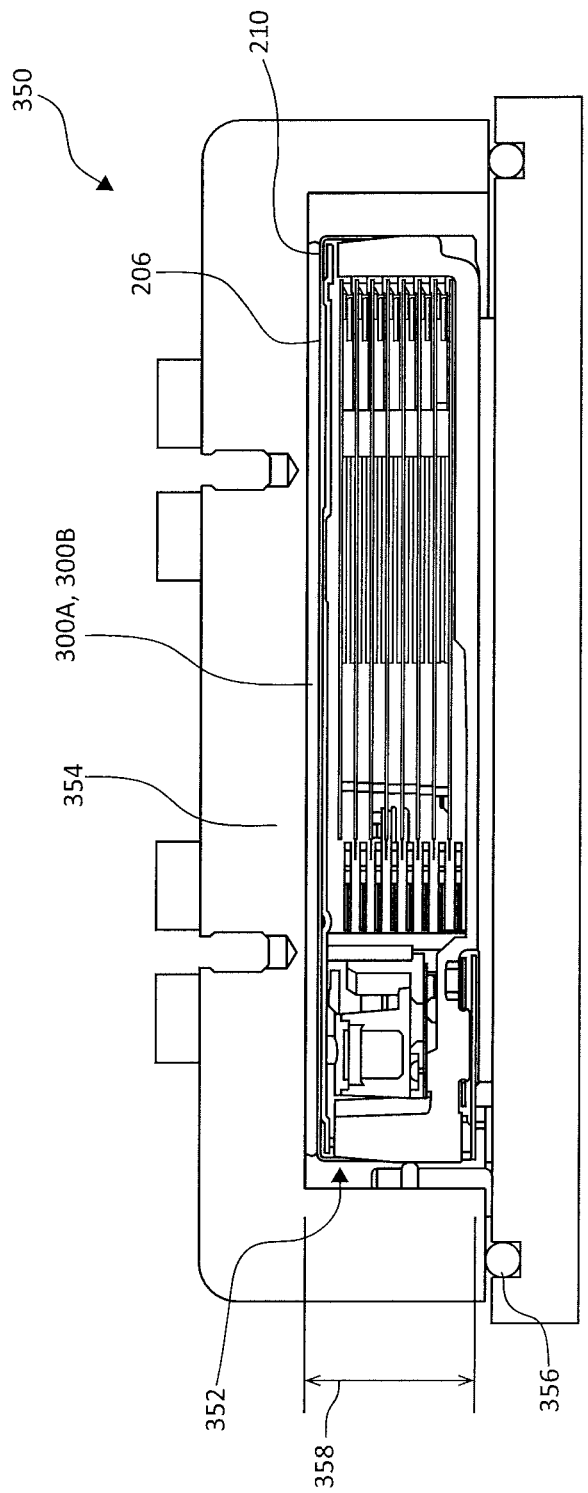
FIG. 3E is a cross-sectional view of a helium leak test (HLT) apparatus with a HDD and one or more vacuum sealed vapor-barrier bags of the type shown in FIG. 3A-3D included therein.

FIG. 3E is a cross-sectional view of a HLT apparatus 350 with HDD 200 included therein. Bag 300A or bags 300B are installed on HDD 200 before a HLT. When vacuum is drawn in HLT chamber 352, the bag(s)/pillow(s) 300A, 300B expand between a top of HDD 200 and a bottom of HLT chamber lid 354, providing a downward force on final cover 206. The downward force prevents the final cover 206 from bulging, which in turn prevents the temporary pressure drop in the interstitial space 210. Bag(s)/pillow(s) 300A, 300B apply substantially zero downward force on top of HDD final cover 206 (and zero upward force on HLT chamber lid 354) until a vacuum is already applied. This allows the HLT chamber 352 to create an initial seal and draw vacuum, which may not be possible with direct contact between final cover and chamber lid 354 (due to HDD height variation). Chamber seal 356 may compress about 0.020 inches under vacuum and HDD height 358 variation may be about +/−0.020 inches.

Figure 4:
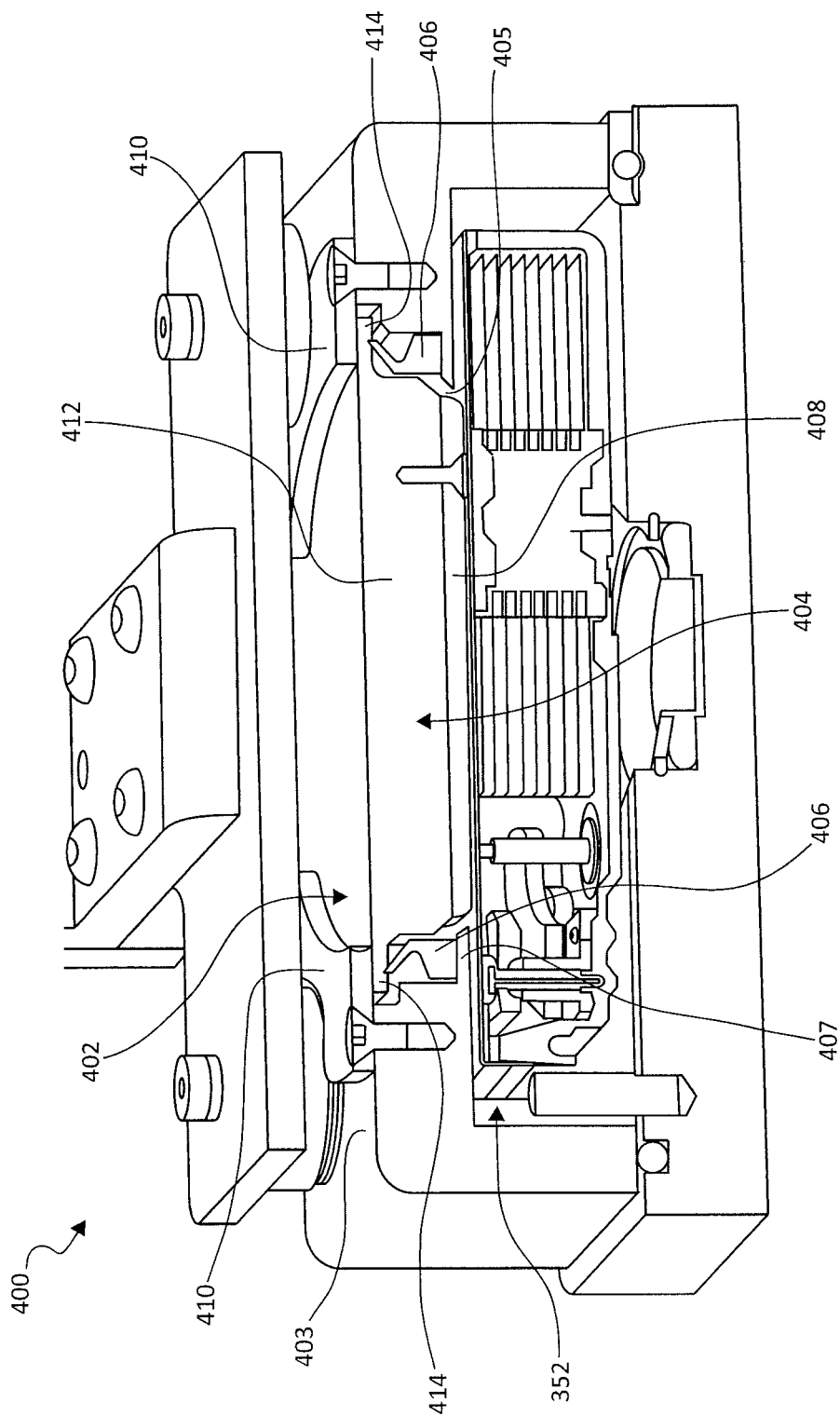
FIG. 4 is a cross-sectional view of a HLT apparatus having a pressure-application structure in accordance with another embodiment.

FIG. 4 is a cross-sectional view of a HLT apparatus 400 having a pressure-application structure in accordance with another embodiment. In the embodiment of FIG. 4, the bag(s)/pillow(s) are replaced by a cover press plate assembly 402 on top of HLT chamber 352, which is covered by a lid 403 that is configured to accommodate cover plate assembly 402. Cover press plate assembly 402 includes a cover press plate 404, an elastic membrane 406 and a pad 408 attached to cover press plate 404. Cover press plate 404 may be formed of any suitable material (e.g., a metal such as stainless steel). In one embodiment, elastic membrane 406 may be formed of rubber and pad 408 may be formed of plastic. However, in different embodiments, any suitable materials may be used for elastic membrane 406 and pad 408.

As can be seen in FIG. 4, cover press plate 404 includes a first relatively thick portion 412 that is positioned within a hole 405 in HLT chamber lid 403. Cover press plate 404 further includes an outer relatively thin portion 414 that rests on elastic membrane 406. Elastic membrane 406 in turn rests on a relatively thin ring-like portion 407 of HLT chamber lid 403. Cover press plate assembly 402 is held in place by clamps 410. In the embodiment of FIG. 4, cover press plate 404, hole 405, elastic membrane 406 and ring-like portion 407 are substantially circular. However, in other embodiments, elements 404, 405, 406 and 407 may have any other suitable shape.

Cover press plate 404 induces a downward force onto HDD 200 based on a pressure differential inside versus outside the HLT chamber 403 (and a small force based on a spring rate and deflection of the elastic membrane 406). This is different from the earlier-described pillow concept, which generates a force based on air inside the pillow and air inside the HLT chamber. Cover press plate 404 is capable of applying the downward force in a more controlled area than the pillow/bag.

As noted above, in some embodiments, elastic membrane 406 is made of rubber. In such embodiments, the exposed rubber membrane can absorb He, which could contaminate subsequent HDD test results, as the He would be extracted from the rubber during subsequent vacuum conditions. An alternate embodiment that addresses this problem is described below in connection with FIGS. 5A and 5B.

Figure 5A:
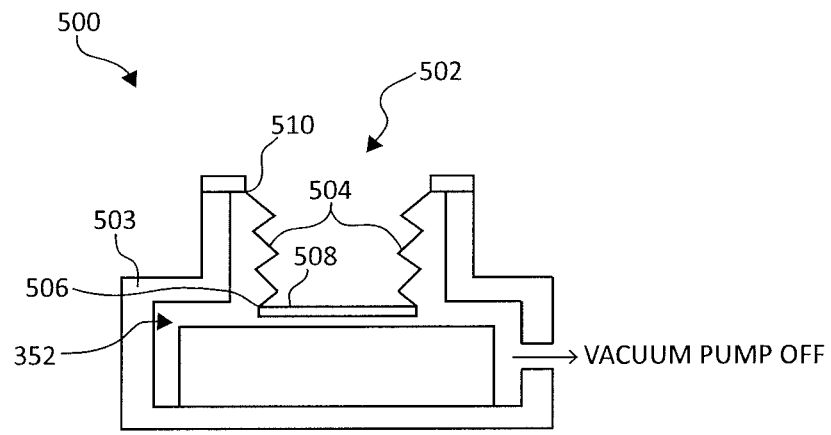
FIGS. 5A and 5B illustrate diagrammatic cross-sectional views of a HLT apparatus having a pressure-application structure in accordance with yet another embodiment.
Figure 5B:
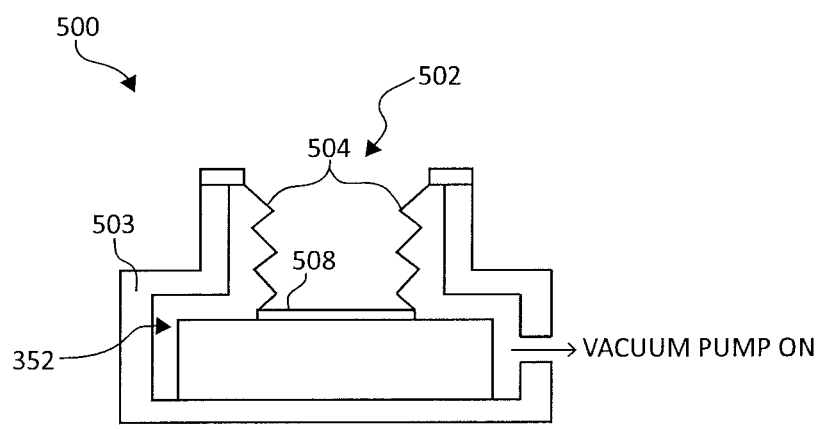

FIGS. 5A and 5B illustrate diagrammatic cross-sectional views of a HLT apparatus 500 having a pressure-application structure in accordance with yet another embodiment. As in the case of the embodiment of FIG. 4, in the embodiment of FIGS. 5A and 5B, a pressure-application assembly 502 is on top of HLT chamber 352, which is covered by a lid 503 that is configured to accommodate pressure-application assembly 502. However, pressure-application assembly 502 includes a bellows 504 instead of an elastic membrane 406 (of FIG. 4). In some embodiments, bellows 504 is made of a metal. Such embodiments provide the flexibility of rubber (in the context of this problem/solution) without the He absorption issue. As can be seen in FIGS. 5A and 5B, a first end 506 of bellows 504 is attached to a pressure-application plate 508 and a second end 510 of bellows 504 is attached to HLT chamber lid 503.

In FIG. 5A, a vacuum pump is OFF and therefore a pressure within HLT chamber 352 is equal to an external atmospheric pressure (outside HLT chamber 352), which may be between about 12.5 pounds per square inch (psi) and about 15 psi. Accordingly, bellows 504 is in a free state and pressure-application plate 508 is not in contact with HDD 200. In one embodiment, when bellows 504 is in a free state, a separation distance between pressure-application plate 508 and a top surface of HDD 200 is about 0.040 inches.

In FIG. 5B, the vacuum pump is ON and the pressure within HLT chamber 352 is substantially equal to zero (e.g., hard vacuum) and the pressure outside HLT chamber 352 remains at atmospheric pressure (e.g., between about 12.5 psi and about 15 psi). Accordingly, bellows 504 is forced into an extended state and pressure-application plate 508 is in contact with HDD 200 and applies a substantial downward force (e.g., approximately 100 pounds) on HDD 200. The downward force generated by the bellows 504 is based on the difference in pressure between the atmosphere and inside the HLT chamber 352 (and a small force based on the spring rate and deflection of the bellows 504).

The embodiment of FIGS. 5A and 5B applies the downward force in a controlled area and has no exposed rubber components. Further, the force applied to the HDD is not reacted by the chamber, and a failure of the bellows is indirectly detectable by a leak in the chamber.

Figure 5C:
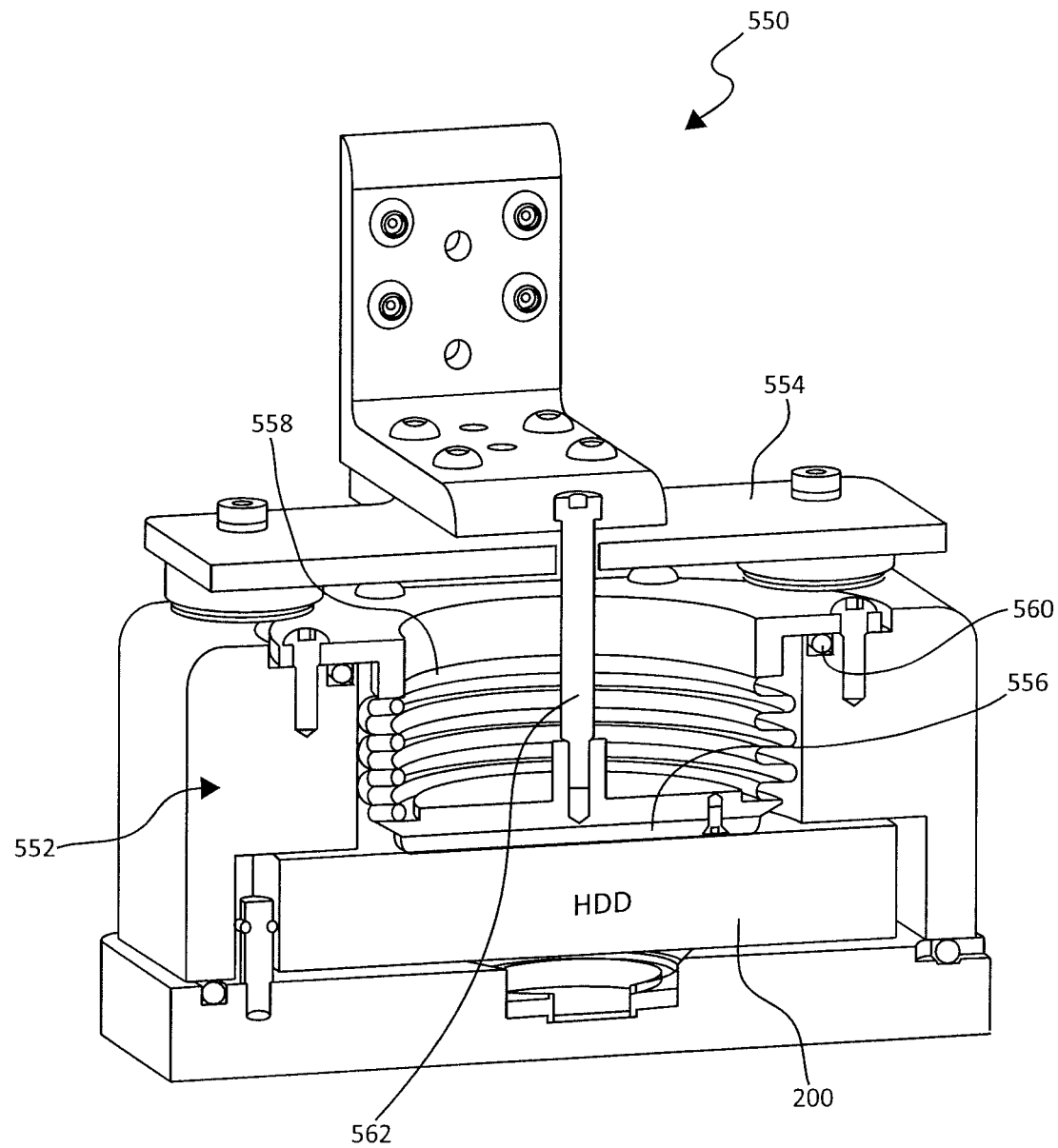
FIG. 5C illustrates a cross-sectional views of a HLT apparatus having an example bellows design.

FIG. 5C illustrates a cross-sectional views of a HLT apparatus 550 having an example bellows design. HLT apparatus 550 includes a chamber body 552, a chamber adapter plate 554, a contact pad 556, a bellows 558, an O-ring seal 560 and an extension stopper (e.g., a shoulder bolt) 562.

In one embodiment, bellows 558 may be formed of a metal (e.g., stainless steel). Bellows 558 may be welded and leak tested before use as a pressure-application structure in HLT apparatus 550. Contact pad 556, which is coupled to bellows 558, presses on HDD 200. Contact pad 556 may be formed of a material that does not scratch a cover of HDD 200. In one embodiment, contact pad 556 may be formed of a plastic. Chamber adapter plate 554 is employed for connecting new chamber 552 with bellows 558 to existing machinery for performing a HLT. O-ring seal 560 is fully compressed by fasteners (e.g., screws) when installing bellows 558. Extension stopper 562 is included to prevent bellows 558 from over extending. If a vacuum is applied inside the chamber without HDD 200, travel of bellows 558 is limited by extension stopper 562 (e.g., a shoulder bolt) connected in a manner shown in FIG. 5C. HLT apparatus 550 operates in a manner described above in connection with FIGS. 5A and 5B to apply pressure on HDD 200.

Figure 6:
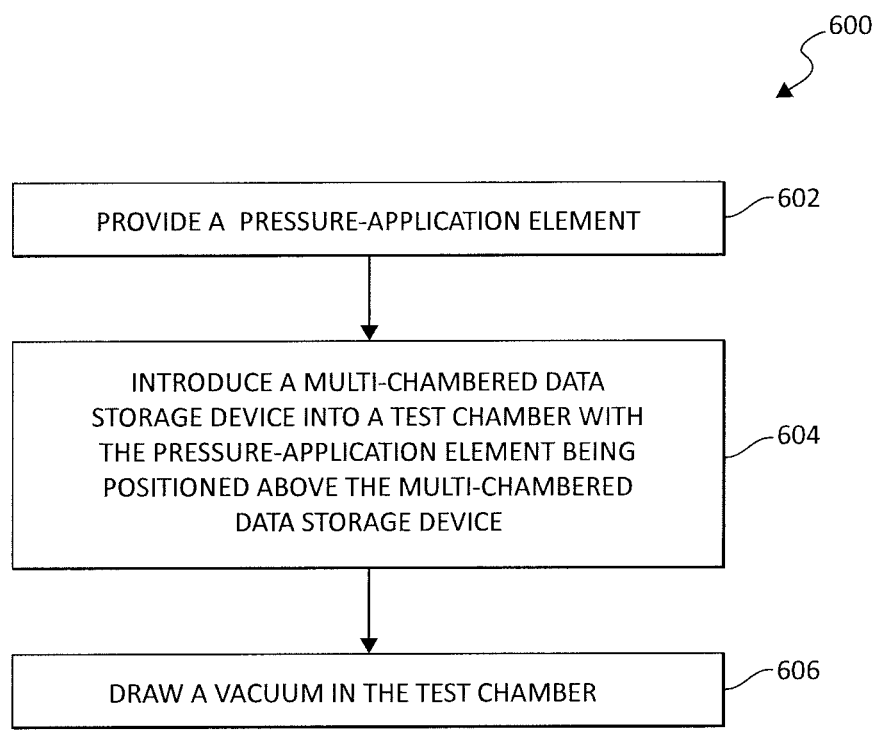
FIG. 6 is a flow diagram of a method embodiment.

FIG. 6 is a flow diagram of a method 600 of carrying out a data storage device gas leakage test in accordance with one embodiment. At block 602, a pressure-application element is provided. At block 604, a data storage device is introduced into a test chamber with the pressure-application element positioned above the data storage device. At block 608, a vacuum is drawn in the test chamber. The vacuum causes the pressure-application element to provide a force on an outer cover of the data storage device, thereby substantially preventing leakage of gas from a first chamber of the data storage device into a second chamber of the data storage device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and therefore are not drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
    a test chamber;
    a pressure-application structure configured to apply a force on a device under test within the test chamber in response to a vacuum being drawn in the test chamber, the force having a magnitude that is proportional to a difference between an external pressure outside the test chamber and an internal pressure within the test chamber; and
    a lid on the test chamber, the lid having a hole that opens into the test chamber and accommodates at least a portion of the pressure-application structure.

2. An apparatus comprising:
    a test chamber; and
    a pressure-application structure configured to apply a force on a device under test within the test chamber in response to a vacuum being drawn in the test chamber, the force having a magnitude that is proportional to a difference between an external pressure outside the test chamber and an internal pressure within the test chamber, wherein the pressure-application structure comprises at least one vacuum sealed vapor-barrier bag.

3. The apparatus of claim 1 and wherein the pressure application structure comprises a plate that substantially fits into the hole.

4. The apparatus of claim 3 and wherein the lid comprises a support portion that surrounds the hole.

5. The apparatus of claim 4 and wherein the pressure application structure further comprises an elastic membrane that rests on the support portion.

6. The apparatus of claim 5 and wherein an outer portion of the plate rests on the elastic membrane.

7. The apparatus of claim 3 and wherein the pressure application structure comprises a bellows having a first end coupled to the plate and a second end coupled to a portion of the lid that is proximate to the hole.

8. The apparatus of claim 7 and wherein the bellows in configured to extend in response to the drawing of the vacuum in the test chamber.

9. The apparatus of claim 7 and wherein the bellows comprises a metal.

10. A method comprising:
providing a pressure-application element;
introducing a multi-chambered data storage device into a test chamber with the pressure-application element being positioned above the multi-chambered data storage device; and
drawing a vacuum in the test chamber, the vacuum causing the pressure-application element to provide a force on an outer cover of the multi-chambered data storage device, thereby substantially preventing leakage of gas from a first chamber of the multi-chambered data storage device into a second chamber of the multi-chambered data storage device.

11. The method of claim 1 and wherein the force comprises a magnitude that is proportional to a difference between an external pressure outside the test chamber and an internal pressure within the test chamber.

12. An apparatus comprising:
a test chamber;
a pressure-application structure configured to apply a force, on a gas-filled multi-chambered device under test (DUT) in the test chamber, that prevents leakage of the gas from a first chamber of the multi-chambered DUT into a second chamber of the multi-chambered DUT; and
a gas sensor that is configured to detect leakage of the gas from the multi-chambered DUT into the test chamber.

13. The apparatus of claim 12 and wherein the pressure-application structure is configured to apply the force in response to a vacuum being drawn in the test chamber, the force having a magnitude that is proportional to a difference between an external pressure outside the test chamber and an internal pressure within the test chamber.

14. The apparatus of claim 13 and wherein the pressure-application structure comprises at least one vacuum sealed vapor-barrier bag.

15. The apparatus of claim 13 and further comprising a lid on the test chamber, the lid having a hole that opens into the test chamber and accommodates at least a portion of the pressure-application structure.

16. The apparatus of claim 15 and wherein the pressure application structure comprises a plate that substantially fits into the hole.

17. The apparatus of claim 16 and wherein the lid comprises a support portion that surrounds the hole.

18. The apparatus of claim 17 and wherein the pressure application structure further comprises an elastic membrane that rests on the support portion, and wherein an outer portion of the plate rests on the elastic membrane.

19. The apparatus of claim 16 and wherein the pressure application structure comprises a bellows having a first end coupled to the plate and a second end coupled to a portion of the lid that is proximate to the hole.

* * * * *